Sept. 29, 1953 — G. N. HEIN, JR — 2,653,603
INJECTION APPARATUS
Filed Aug. 3, 1950 — 2 Sheets-Sheet 1
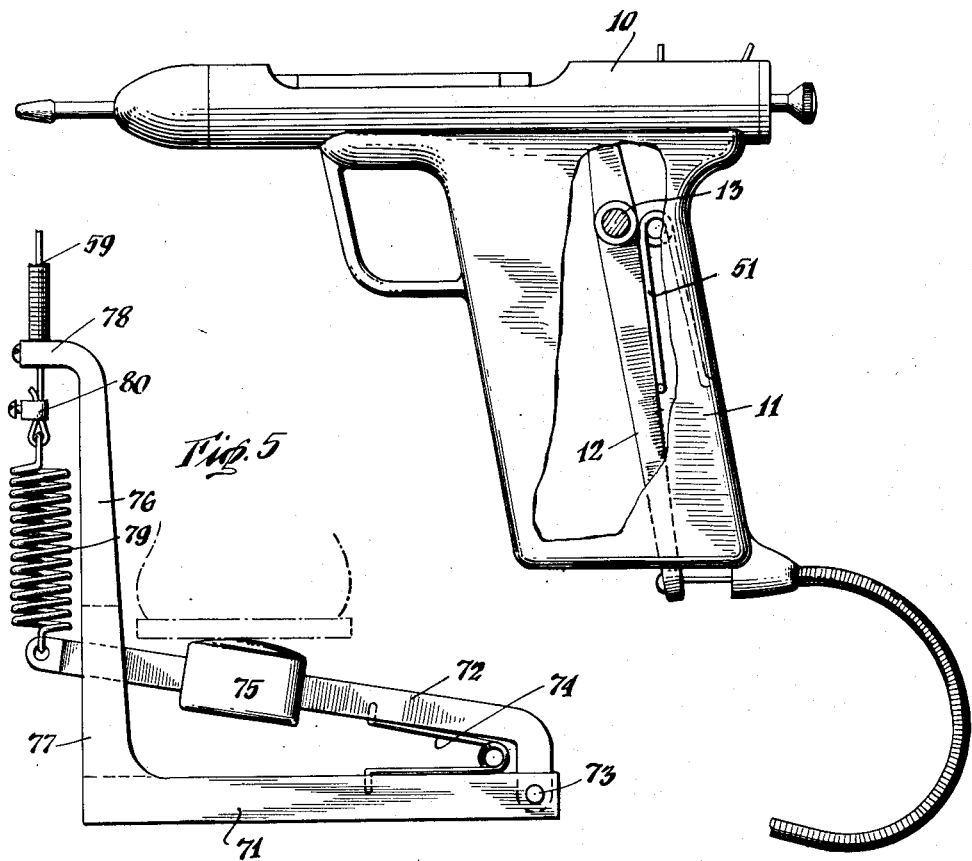
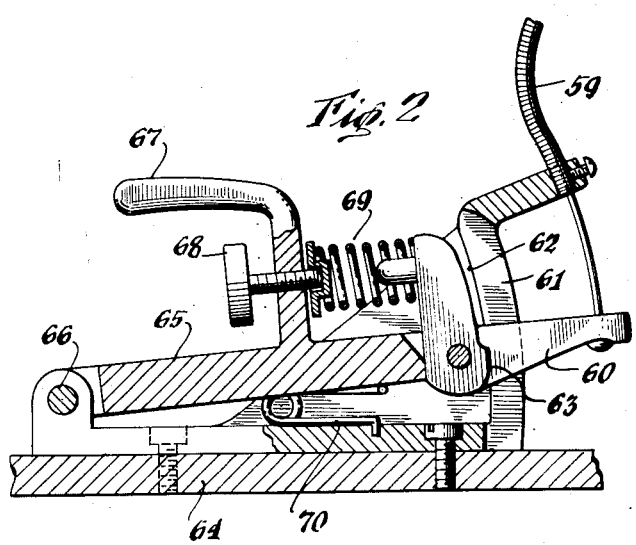
INVENTOR.
George N. Hein, Jr.
BY Duell and Kane
ATTORNEYS

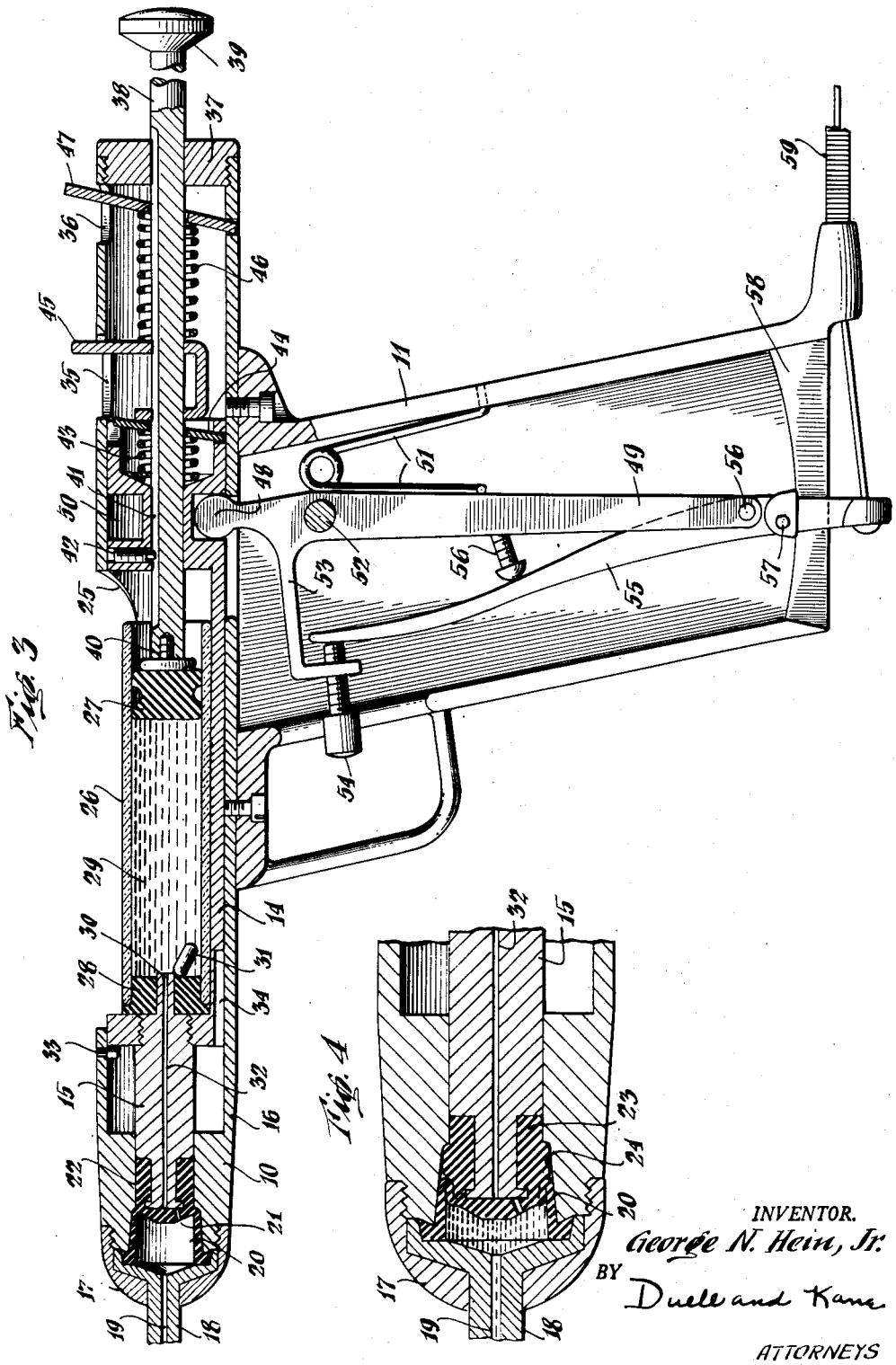

Patented Sept. 29, 1953

2,653,603

UNITED STATES PATENT OFFICE 2,653,603

INJECTION APPARATUS

George N. Hein, Jr., San Carlos, Calif.

Application August 3, 1950, Serial No. 177,389

7 Claims. (Cl. 128—173)

This invention relates to a structurally and functionally improved hypodermic injection apparatus and especially a velocity injection structure by means of which medicaments may be hypodermically injected without it being necessary to employ a skin-penetrating needle.

An object is that of providing an injection device capable of being operated with minimum effort and in which, during the injection stage, both hands of the user will be available for manipulating the medicament-containing portion of the apparatus from which the fluid is to be injected into the tissues of the patient.

A still further object is that of providing an assembly of this nature which will not require a contained power storage means nor an outside source of power for its operation. Rather, the apparatus will embrace a unitary assembly capable of ready manipulation by the operator without there being any danger of the latter incurring fatigue or strain either in the setting, cocking, or firing of the mechanism.

An additional object is that of providing an assembly embracing relatively few parts each individually simple and rugged in construction, such parts being capable of ready assembly and when so combined furnishing a unitary apparatus operating over long periods of time with freedom from all difficulties.

With these and other objects in mind reference is had to the attached sheets of drawings illustrating practical embodiments of the invention and in which:

Fig. 1 is a side elevation of the injection apparatus, the discharge nozzle of which embodies a structure primarily useful in connection with dental work;

Fig. 2 is a partly sectional side view of an operating unit or treadle suitable for connection with the device as shown in Fig. 1;

Fig. 3 is a sectional side view of the injection device as illustrated in the first figure;

Fig. 4 is a fragmentary sectional side view of the medicament chamber in partially discharged condition; and Fig. 5 illustrates an alternative form of treadle structure which may be utilized in lieu of that shown in Fig. 2.

Referring primarily to Figs. 1 and 3 there has been shown an injection apparatus embracing a main body or barrel portion 10 from which a grip 11 extends downwardly to thus furnish a unit having the general appearance of a pistol. The apparatus shown in Fig. 1 may, in effect, duplicate the assembly of mechanism shown in Fig. 3, excepting only that in Fig. 1 the operating lever 12 is of simple design and in shifting around its mounting pivot 13 serves merely to operate the mechanism as hereinafter described. In the structure shown in Fig. 3 this operating lever (as later brought out) embraces an assembly functioning not alone to operate the mechanism of the injector but also to prevent an improper operation of the same.

Insofar as the details of that mechanism are concerned, it will be seen that as in Fig. 3 it preferably includes an actuating member 14 mounted for reciprocation within and in a direction axially of body 10. This member may be provided adjacent its forward end with a plunger portion 15. Body 10 terminates in an outer end portion formed with a base bore 16 continued in the form of a bore within which the end of plunger 15 may reciprocate. A loading cap 17 may be mounted at the outer end of body 10 and serve to retain a nozzle 18 formed with a bore 19. Either the entire length of this bore is reduced, or preferably its outer end is constricted to define an orifice of a value of .002" to, for example, .008". If nozzle 18 is to be used in connection with dental injections then it may be relatively long as shown in Fig. 1. Otherwise, it may be reduced in length to terminate immediately beyond loading cap 17.

Adjacent the base of nozzle 18 the medicament chamber may be provided. This may take the form of a cup 20 conveniently formed of rubber and of a capacity equal to that of the desired injection. The base of the cup may be perforated as at 21 and continued in the form of a sleeve 22 which is coupled against displacement with respect to the head of plunger 15. As shown in Fig. 3, this sleeve embodies a substantially constant diameter. As illustrated in Fig. 4, the sleeve 23 may be provided with a shouldered portion 24.

Body 10 provides an opening 25 through which an ampule may be introduced into the apparatus. The body of this ampule has been indicated at 26 and may be formed of glass. Adjacent its rear end the ampule mounts a piston type stopper 27. A headed stopper 28 may close the forward end of the ampule which provides a reservoir for a body of medicament 29. The volume of that body is, as shown, many times the capacity of the medicament chamber as defined by cup 20. Stopper 28 is formed with an opening through which the reduced inner end 30 of plunger 15 may be projected. The opening in stopper 28 is normally closed by a plug 31 conveniently formed of glass. Plunger 15 is provided with a passageway 32 extending longitudinally of its body and terminating in a discharge end axially displaced with respect to orifice 21. A stop 33 may extend into bore 16 and normally prevent a projection of actuating member 14. The latter is rotatable with respect to body 10 and formed with a groove 34 capable of being aligned with stop 33. When so aligned, actuating member 14 may be projected.

Consequently, it is obvious that ampule 26 may be dropped or placed in position within body 10. Thereafter, actuating member 14 may be rotated so as to align groove 34 with stop 33. This will cause the actuating member, together with body 10, to encase the ampule 26. The rotation of actuating member 14 in either direction may be manually effected by simply grasping any projecting portion of that member which extends beyond the edge of opening 25 and turning the member through substantially 180°. The plunger portion 15 attached to member 14 will likewise turn. However, cup 20 will not rotate. Rather the head portion of the plunger projecting into the sleeve will turn within the socket defined by the bore of that sleeve and the surfaces adjacent the base of the cup. When now the parts are operated with creation of resultant pressure there will be no danger of injury to the physician incident to the possibility of flying glass fragments, should the ampule burst. Rather in such event all fragments will remain within the space defined by body 10 and member 14. Under normal conditions the device may be operated as hereinafter described and after the ampule has been discharged, the operator may again rotate actuating member 14. Thereupon, with the parts retracted to their initial position the spent ampule may readily be removed and a new ampule brought into position.

The rear portion of body 10 may be formed with openings 35 and 36 and have an end closure 37. A rod 38 projects therethrough and terminates conveniently in a knob 39. This rod has its forward end extending to a point adjacent the rear of ampule 26, and conveniently terminates in a threaded socket which may receive a threaded stem 40 securing a stopper contacting member against displacement.

A guiding structure, while not essential, has been illustraated in Fig. 3 in which the rod is formed with a groove or keyway 41. Riding within the latter is the end of a bolt 42 carried by the rear portion of the actuating member 14. That rear portion also supports a relatively powerful spring 43 which bears against a wedging plate 44 rockably carried by the same rear portion and encircling rod 38. To the rear of plate 44 a releasing member 45 also encircles rod 38. A spring 46 which, in comparison with spring 43 is relatively weak, is disposed to the rear of member 45. A wedging plate 47 is engaged by the rear end of spring 46 and is rockably supported by body 10. This plate also encircles rod 38. It extends through the opening 36. Member 45 extends through opening 35. It will be apparent that spring 43 and plate 44 shift with actuating member 14.

The head portion 48 of an operating lever which is identified by the numeral 49 in Fig. 3 extends into a groove 50 formed in actuating member 14. A retracting spring 51 bears against this lever and, as in Figs. 1 and 3 urges the lower end of the same in a clockwise direction. Lever 49 corresponds generally to lever 12 as shown in Fig. 1 and is pivotally supported as at 52. It is conveniently formed with an extension 53 mounting an adjusting bolt 54. The end of that bolt bears against the upper end of an arm 55 formed of resilient material which is engaged by an adjustable stop 56 carried by lever 49. Arm 55 is pivotally attached as at 56 to the lower end of lever 49. A brake shoe 57 is carried by arm 55 below the lever which supports it. This shoe cooperates with an arcuate braking surface 58 conveniently forming a part of the handle portion 11. The end of a Bowden cable assembly 59 is secured to the end of arm 55 at a point conveniently beyond handle 11 and is also conveniently attached to a part of that handle.

If it is not desired to embody the braking structure within the body of the instrument then as in Fig. 2 the lower end of the Bowden cable 59 is coupled to the outer arm of a bell crank lever 60. This arm may project through the slot 61 of a bracket, the upper end of which has secured to it the encasing member for the cable. To one or both sides of slot 61 arcuate braking surfaces 62 are provided. These are engaged by brake shoe projections 63 forming a part of lever 60. The entire assembly may be supported on a plate 64 which pivotally mounts a lever 65 as indicated at 66. A foot contacting portion 67 extends upwardly from lever 65. It conveniently carries an adjusting screw 68 by means of which the pressure exerted by a spring 69 on the inner end of bell crank lever 60 may be varied. A return spring 70 may be interposed between plate 64 and plate 65 so that the latter is normally urged in an upward direction.

A simple form of control and operating assembly has been shown in Fig. 5. In that view the numeral 71 indicates a base plate to which an operating plate or lever 72 is pivotally attached as at 73. A spring 74 normally urges the lever 72 to elevated position. A foot contacting portion 75 may be associated with lever 72. Plate 71 is conveniently continued in the form of an upwardly extending portion 76 formed with a slot 77 through which the end of lever 72 projects. The upwardly extending portion terminates in a guide 78 to which the sheath of the Bowden cable assembly 59 is secured. The operating wire of that assembly has attached to it a spring 79 which is in turn coupled to lever 72. The connection between the wire and the spring is conveniently effected by a clamp 80.

As afore brought out ampule body 26 is inserted through opening 25 with actuating member 14 shifted to a position at which such loading is permissible. In this position plunger 15 may be projected incident to the engagement of the stop 33 with the adjacent surface of the actuating member 14. However, when the latter is turned so that slot 34 aligns with the stop then projection may be effected. Prior to the removal of the spent ampule, rod 38 is retracted. Such retraction is possible by shifting member 45 and plate 47 to the left as viewed in Fig. 3. With such shifting, gripping engagement between that plate and rod 38, as well as between the rod and plate 44 is released. Therefore, the end of rod 38 may be brought to a position at which it clears the rear end of the ampule. As the fresh ampule is disposed in proper position, the rearwardly projecting portion 30 of plunger 15 will penetrate the opening of stopper 28. With such penetration stopper or plug 31 will be displaced. Thereupon an operator may manually project rod 38 by, for example, the knob 39. Such projection will not be resisted by plates 44 and 47 in that they will allow movement to the left as viewed in Fig. 3. When cooperating normally with rod 38 they will not allow movement of the latter to the right as viewed in that figure.

As the operator shifts rod 38 to the left its outer end will engage stopper 27. Continuous projection will move that stopper towards the discharge end of the unit. Therefore, medicament 29 will flow through passage 32 and acting against the base of cup 20 will flow through orifice 21 into the medicament chamber. This action of the parts may be continued until medicament is discharged from nozzle 18 which will evidence that all voids have been eliminated. If, now, lever 12 as in Fig. 1, or lever 49 as in Fig. 3 are swung in counterclockwise directions, actuating member 14 will be shifted to the left as illustrated in those figures. With such shifting the end of plunger 15 will bear intimately against the base of cup 20. Accordingly, a seal, or check-valve structure, will be established between orifice 21 and passage 32 such that a rearward flow of the medicament from that chamber is prevented. This projecting movement of plunger 15 occurring, cup 20 will be collapsed or folded back upon itself in the manner shown in Fig. 4. A similar action will occur whether sleeve portion 22 is shouldered as at 24, as in Fig. 4, or whether it is purely cylindrical as at 22 in Fig. 3. Due to the thrust of plunger 15 and the pressure built up within cup 20, displaced rubber from sleeve 22 fills the void caused by pulling back of the wall of cup 20. This prevents that wall from distending rearwardly and being subjected to undue stretching and chafing. In any event, all medicament will be substantially discharged from the chamber defined by the cup and ejected from the orifice of the nozzle. If such ejection occurs under adequate pressure and velocity, no skin-penetrating needle will be necessary.

If pressure on levers 12 or 49 is now relieved, they will return to the position shown in Fig. 1 under the influence of spring 51. With such return, actuating member 14 will be shifted completely to the right in the views under consideration. It will carry with it the ampule 26, the spring 43, plate 44 and member 45. The latter will function as a stop for member 14. Clamping plate 47 will prevent rearward movement of the rod 38. Therefore, as ampule 26 moves rearwardly, piston 27 will remain stationary. This will cause medicament to be automatically transferred from ampule 26 through passage 32 to the medicament chamber as aforedescribed. Thus, on each rearward stroke or movement of the parts a refilling of the medicament chamber will occur.

During the working stroke (i. e. injection of medicament), if a grouping of apparatus such as has been illustrated in Figs. 1 and 2 is provided, then it is apparent that an operator bringing his foot to bear on contact portion 67 will transmit force through plate or arm 65, bell crank lever 60 and the Bowden wire assembly 59 to the lower end of the instrument lever. As a consequence of that pressure, the wire of the assembly will rock that lever 12 rearwardly or in a counterclockwise direction. Certain internal pressures will be built up within the apparatus which will resist the movement of the lever as aforedescribed. If a pre-determined thrust value is exceeded these back pressures will cause a corresponding strain to be imparted to the outer arm of bell crank lever 60. The latter will therefore tend to swing around its pivot against the action of spring 69. With such swinging braking surfaces 62 will be engaged by the braking shoes or portion 63. This will reduce the force with which plate or lever 65 may be swung downwardly and therefore reduce the pull exerted on the cable assembly. By means of the adjusting screw 68 an operator may control the precise pressure exerted by spring 69. Accordingly, the amount of strain or force transmitted through the cable (and aside from friction losses) may be precisely determined.

If a structure such as has been shown in Fig. 5 is employed, then even if an operator brings such force to bear on portion 75 as to cause arm 72 to swing to a position adjacent base 71, no excessive pressures will be developed. This will be because spring 79 has a pre-determined value. Therefore, if under these circumstances, spring 79 is tensioned to a maximum extent, the amount of strain transmitted through the Bowden cable assembly will not materially exceed the minimum pressures so capable of transmission. The latter will be created, of course, if an operator moves lever 72 downwardly at a relatively slow speed. With an apparatus such as is shown in Fig. 5, it is nevertheless preferred that a governing control be incorporated in the assembly. A control ideally suited for use in this connection has been shown in Fig. 3 and the parts have been previously described.

These parts function in that if a pull is exerted on the Bowden cable, this pull will be transmitted through the lower end of arm 55 and pivot 56 to the pressure regulator screw 54 to cause lever 49 to swing around its pivot 52. Due to the resilient nature of arm 55 too great a pressure transmitted through the lower end of the assembly will cause arm 55 to flex between pivot 56 and adjusting screw 54. With such pressure brake shoe 57 will be forced into close frictional contact with braking surface 58. Therefore the effective pull on lever 49 will be reduced by an amount corresponding to this braking effect. If, however, a maximum proper strain is transmitted through the cable then these cooperating braking surfaces will in effect remain substantially inoperative. Under these circumstances lever 49 will be rocked around pivot 52 at a maximum speed consistent with the setting of the parts.

Assuming that a pressure of 2,500 pounds per square inch is required within the medicament chamber as defined by cup 20, or its equivalent, in order to properly achieve the desired injection and that 120 lbs. thrust on actuating member 14 is necessary to develop that pressure, then a 30 lb. pull on the wire of the assembly 59 will achieve the desired results, aside from small variables incident to friction losses. This will be because levers 12 and 49 will have, for example, a 4 to 1 ratio on actuating member 14. Therefore the pull as afore stated will achieve the desired results. If an apparatus such as is shown in Fig. 2 is employed, then screw 68 may be adjusted to tension spring 69 so that it will exert a thrust against the upper arm of bell crank lever 60 requiring a pull of in excess of 30 lbs. against the outer end of the bell crank lever to compress spring 69. Such compression will, of course, be evidenced by a rocking of the bell crank lever around its pivot and the cooperation of braking surfaces 62 and 63. Therefore, even if an operator brings a pressure of, for example, 50 lbs. to bear against that end of the lever assembly to which the Bowden cable is attached (i. e. outer arm 60 of the bell crank lever) no such pull will be transmitted by the cable. Rather, the parts will be braked to where only 30 lbs. of force will be transmitted. In this connection it will be appreciated that due to the various leverages illustrated in both Figs. 2 and 3 the braking pressure will be of a very high order and directly proportioned upon the amount of excess pressures which the operator attempts to transmit. These could be created by the operator carelessly placing his entire weight on the foot control. With an experienced operator he will, of course, be able to project the parts with a fairly even pressure if no governing control were employed. In this connection he will observe the speed of piston movement of the injection device in addition to being generally cognizant of the pressure which he was exerting with his foot. This would be similar to the operation of an ordinary syringe and a manually operated pressure piston. However, with the safety provisions of control such as herein taught being present, then, even with careless operation, no undesirable end result will occur.

Thus, among others, the several objects of the invention as specifically aforenoted are achieved. Obviously numerous changes in construction and rearrangement of the parts might be resorted to without departing from the spirit of the invention as defined by the claims.

I claim:

1. A hypodermic injection apparatus including in combination a body having a medicament chamber, means movably mounted by said body to cause a forcible expulsion of medicament from said chamber, force-producing means, means connecting the same with said movable expelling means, movable braking means operatively coupled to said force-producing means and means rendered effective upon said force-producing means being operated in a certain manner to cause a functioning of said braking means.

2. In a hypodermic injection apparatus as a sub-combination foot controlled force-producing means comprising a shiftable lever to be engaged by the foot and operatively connected to the hypodermic injection apparatus, braking means connected to be operated by said lever to limit the speed with which the latter may be shifted and means for adjusting the restraining force exerted by said braking means.

3. A hypodermic injection apparatus including in combination a body having a chamber from which medicament is to be expelled at a pressure not exceeding a predetermined maximum, means movably mounted by said body and projectible in one direction to cooperate with said chamber for effecting such expulsion, shiftable means connected to project said movable means and having a force-producing potential in excess of such predetermined maximum and braking means forming a part of said apparatus and functioning automatically upon said shiftable means being operated in a manner to produce excessive force to limit the force of projection of said movable expulsion means to an amount less than that which would result in a medicament expulsion pressure in excess of the predetermined maximum.

4. A hypodermic injection apparatus including in combination a body having a chamber from which medicament is to be expelled at a pressure not exceeding a predetermined maximum, means movably mounted by said body and projectible in one direction to cooperate with said chamber for effecting such expulsion, power-producing means operable to exert a force beyond that required to produce the predetermined maximum, means connecting said power means with said movable means to project the latter and braking means forming a part of said apparatus and functioning automatically upon said shiftable means being operated in a manner to produce excessive force to limit the force of projection of said movable expulsion means to an amount less than that which would result in a medicament expulsion pressure in excess of the predetermined maximum.

5. A hypodermic injection apparatus including in combination a body having a chamber from which medicament is to be expelled at a pressure not exceeding a predetermined maximum, means movably mounted by said body and projectible in one direction to cooperate with said chamber for effecting such expulsion, shiftable means connected to project said movable means and having a force-producing potential in excess of such predetermined maximum, braking means carried by and movable with respect to said body and means connecting said braking means with said movable means to restrain the latter upon said shiftable means being operated in a manner to produce excessive force whereby to limit the force of projection of said movable expulsion means to an amount less than that which would result in a medicament expulsion pressure in excess of the predetermined maximum.

6. A hypodermic injection apparatus including in combination a body having a chamber from which medicament is to be expelled at a pressure not exceeding a predetermined maximum, means movably mounted by said body and projectible in one direction to cooperate with said chamber for effecting such expulsion, foot-operated shiftable means providing the power for said apparatus and separate from said body, said latter means having a force-producing potential in excess of such predetermined maximum, means connecting said shiftable means with said movable means and braking means forming a part of said shiftable means and functioning automatically upon the latter being operated in a manner to produce excessive force to limit the force of projection of said movable expulsion means to an amount less than that which would result in a medicament expulsion pressure in excess of the predetermined maximum.

7. In a hypodermic injection apparatus as a sub combination foot-controlled force-producing means comprising a shiftable lever to be engaged by the foot, means for connecting said lever to operate a hypodermic injection apparatus, braking connected to said lever and means operatively coupled to said braking means and lever and effective upon the latter being moved in a certain manner to render said braking means operative.

GEORGE N. HEIN, Jr.

References Cited in the file of this patent

UNITED STATES PATENTS

| Number | Name | Date |
| --- | --- | --- |
| 791,802 | De Lisle | June 6, 1905 |
| 1,046,166 | Flaherty | Dec. 3, 1912 |
| 1,373,803 | Dunn | Apr. 5, 1921 |
| 1,456,469 | Schwidetzky | May 22, 1923 |
| 1,852,658 | Kile | Apr. 5, 1932 |
| 2,244,969 | Smith | June 10, 1941 |
| 2,322,244 | Lockhart | June 22, 1943 |
| 2,322,245 | Lockhart | June 22, 1943 |
| 2,380,534 | Lockhart | July 31, 1945 |
| 2,547,099 | Smoot | Apr. 3, 1951 |
| 2,550,053 | Ferguson | Apr. 24, 1951 |